Figures 6, 7:
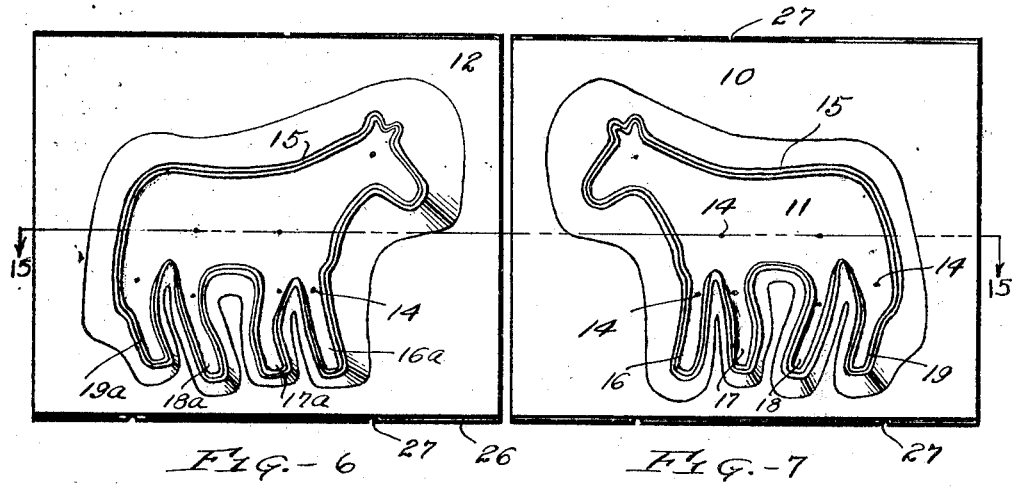

April 19, 1927.  J. SCHAEFER  1,625,399
METHOD OF AND APPARATUS FOR MAKING HOLLOW RUBBER ARTICLES
Filed June 28, 1924    5 Sheets-Sheet 1
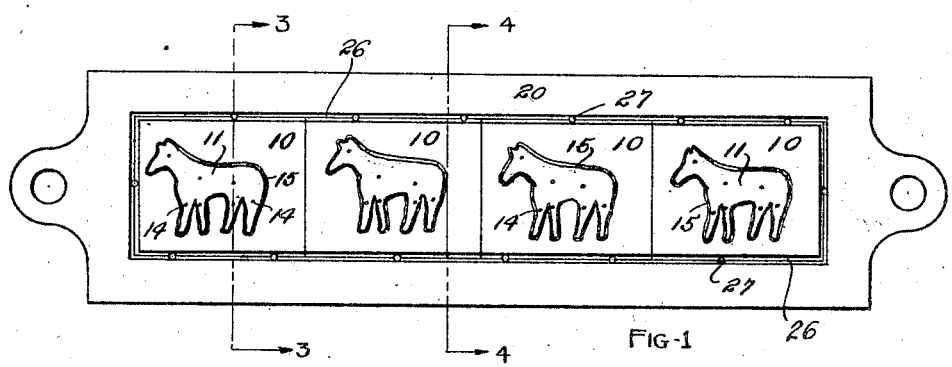
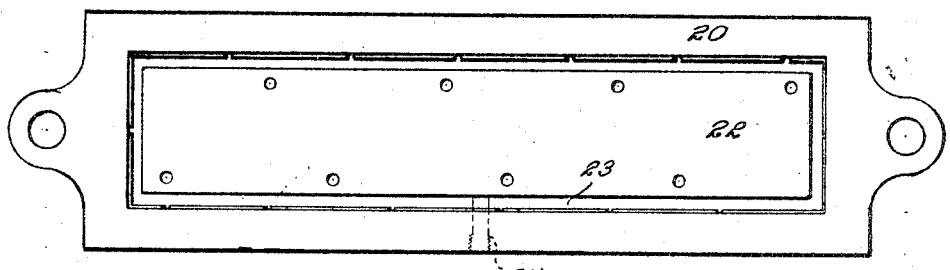
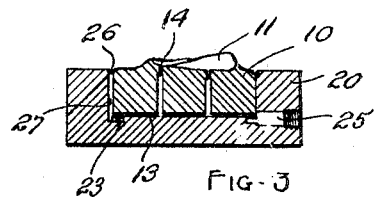
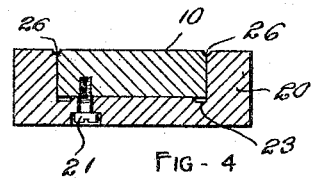
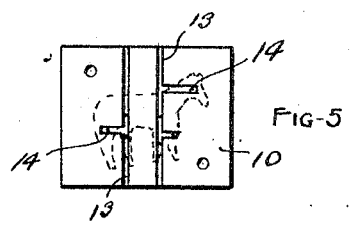
INVENTOR
James Schaefer
By Bates, Macklin, Goldrick & Hare,
ATTORNEYS.

April 19, 1927.

J. SCHAEFER 1,625,399

METHOD OF AND APPARATUS FOR MAKING HOLLOW RUBBER ARTICLES

Filed June 28, 1924      5 Sheets-Sheet 2

INVENTOR
James Schaefer
By Bates, Macklin Goodrick, Tear
ATTORNEYS

April 19, 1927.
J. SCHAEFER
1,625,399
METHOD OF AND APPARATUS FOR MAKING HOLLOW RUBBER ARTICLES
Filed June 28, 1924  5 Sheets-Sheet 3
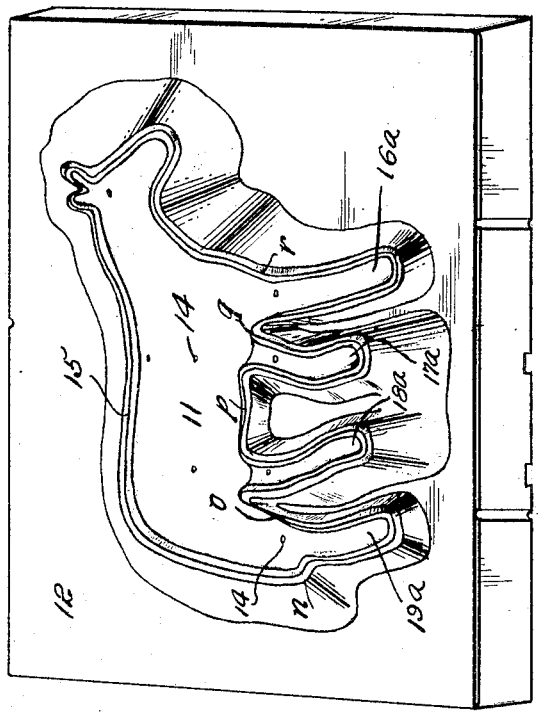
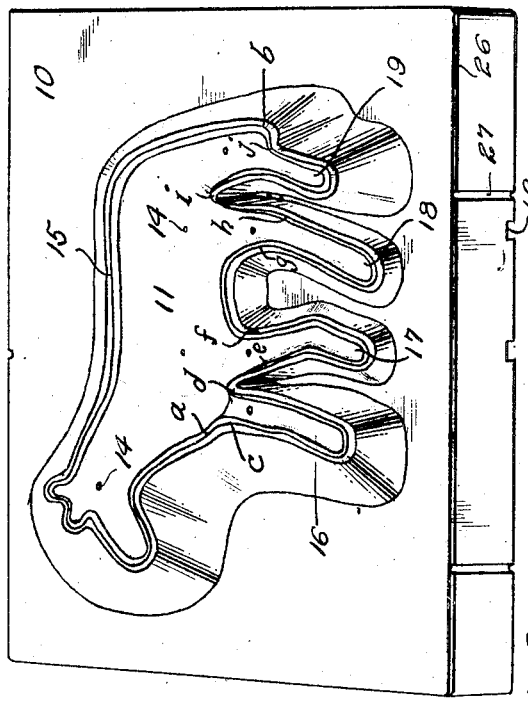
INVENTOR
James Schaefer
ATTORNEYS April 19, 1927. 1,625,399
J. SCHAEFER
METHOD OF AND APPARATUS FOR MAKING HOLLOW RUBBER ARTICLES
Filed June 28, 1924 5 Sheets-Sheet 4

INVENTOR
James Schaefer
By
Bates Macklin Goodrich & Nevin
ATTORNEYS

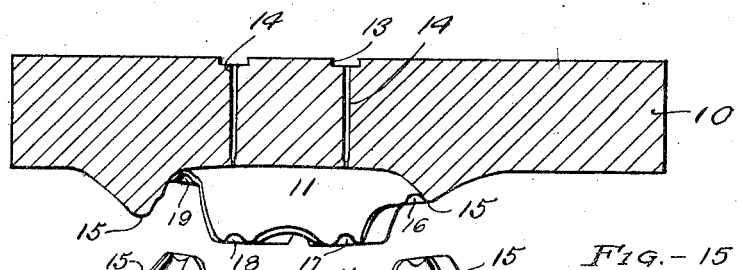
Fig.-15
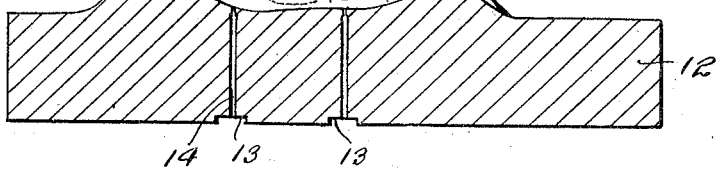
Fig 16
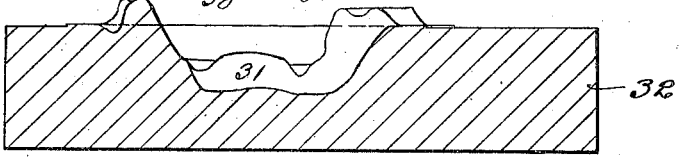
Fig.-17
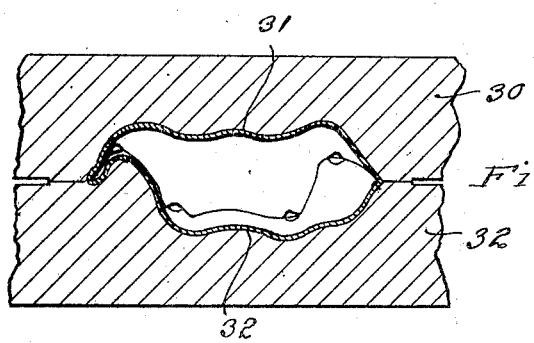

Patented Apr. 19, 1927.

1,625,399

UNITED STATES PATENT OFFICE.

JAMES SCHAEFER, OF YONKERS, NEW YORK, ASSIGNOR TO PARAMOUNT RUBBER CONSOLIDATED INC., A CORPORATION OF DELAWARE.

METHOD OF AND APPARATUS FOR MAKING HOLLOW RUBBER ARTICLES.

Application filed June 28, 1924. Serial No. 722,986.

This invention relates to a method of and apparatus for making hollow rubber articles having certain portions or regions thereof offset from other portions or regions, such as rubber toy animals and similar objects.

In making rubber toy objects, for instance, animals where there are legs off-set from a plane passing through the mid-portion of the animal, the usual practice heretofore has been to form the opposing halves and then to cement the halves prior to vulcanization. One of the difficulties of joining two halves of a rubber toy animal in the vulcanizing process has been due to the fact that the body has usually been died out between male and female dies and semi-cured to hold its shape until vulcanized, and the semicuring interferes with satisfactorily securing the parts together. Moreover, the operation is comparatively slow and expensive, and the initial expense of matching male and female dies is considerable.

The object of my invention is to provide for pneumatically forming hollow rubber objects, of the character set forth, so as to eliminate the necessity for pressing the halves between male and female dies, and to enable economical and rapid operation.

I carry out the above object by using a two part forming mold so arranged that the different cavities therein (the legs of the animal for instance) lie side by side though in offset planes and are embraced by a continuous raised warped cutting edge which defines the periphery of the biscuit. This cutting edge gradually diverges from one plane to another by an incline which is always materially less than normal to the plane of separation of the mold members, so that throughout its extent it has a cutting action when the two mold members are brought together. The various projections of the biscuit, as for instance the legs and ears of the animal are sufficiently distorted from the natural position so that the cutting edge forms a continuous circuit, never having one portion behind another, and always having a horizontal component. The variation from a plane in one mold member is responded to by a complementary variation in the outer mold member, so that notwithstanding the cutting edges are out of a plane they meet throughout, when the mold members are brought together.

Provision is made for pneumatically forcing raw rubber sheet stock into the cavities of the two mold members and then these members are brought together to form a seam and cut off the surplus stock, thus providing a suitable biscuit. Before the junction, some suitable heat expanding substance may be placed in the lined lower mold member, then, after the biscuit is formed, it is transferred to a properly shaped vulcanizing mold and heated, thereby gasifying the enclosed material, giving the desired internal pressure. If desired, such gas may be of permanent nature and retained in the forming article.

An apparatus for carrying out the above method is illustrated in the drawings and set forth in the following description. My invention includes both the method and apparatus, and its essential features will be summarized in the claims.

Figures 8, 9:
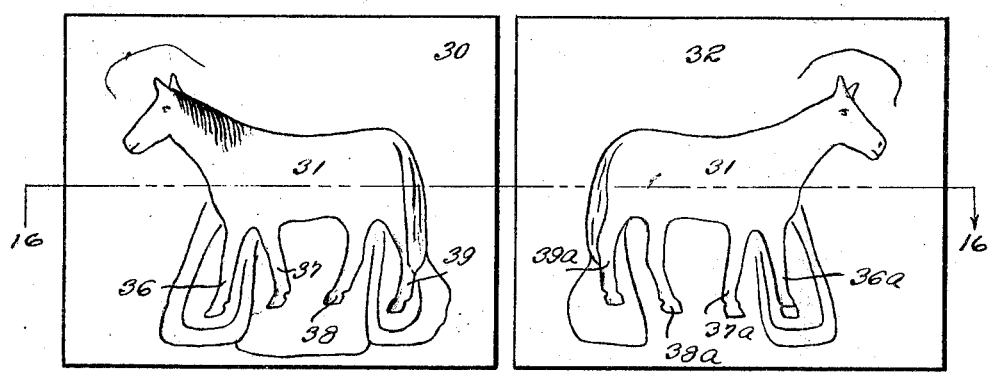
Figure 12:
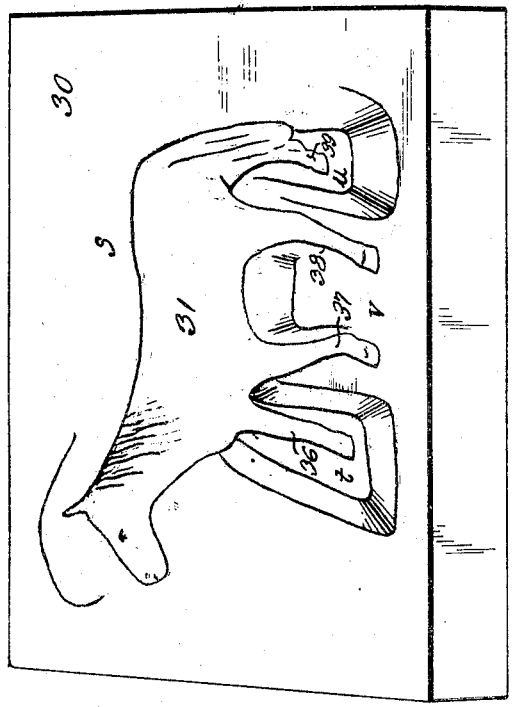
Figure 13:
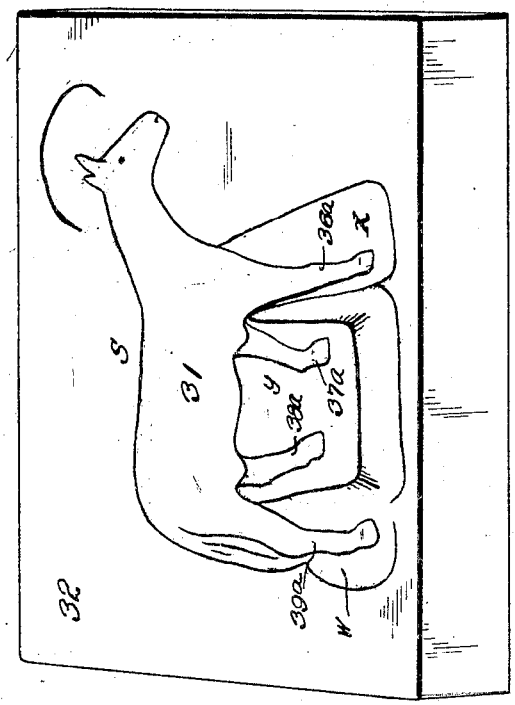
Figure 14:

In the drawings, Fig. 1 is a plan of several forming members responding to this invention, mounted in a suitable holder or basket having a suction connection, whereby the cavities may be exhausted of air. Fig. 2 is a plan of such basket with the mold members removed. Figs. 3 and 4 are cross sections on the lines 3—3 and 4—4 on Fig. 1. Fig. 5 is a bottom plan of one of the forming mold members. Figs. 6 and 7 are face plans of the two forming mold members, the particular cavities shown being designed for the formation of a toy horse. Figs. 8 and 9 are face plans of the corresponding vulcanizing molds. Figs. 10 and 11 are perspectives of the two forming molds shown in plan in Figs. 6 and 7. Figs. 12 and 13 are perspectives of the two vulcanizing molds shown in plan in Figs. 8 and 9. Fig. 14 is a view of the biscuit formed by the molds of Figs. 6 and 7 or 10 and 11. Fig. 15 is a sectional view of the two forming molds separating, but in proper vertical position for coaction, the plane of the section being indicated by the line 15—15 on Figs. 6 and 7. Fig. 16 is a corresponding section of the corresponding vulcanizing mold, the plane of the section, being indicated by the line 16—16 on Figs. 8 and 9. Fig. 17 is a fragmentary section of the vulcanizing mold corresponding to Fig. 16, but showing the parts as brought together and enclosing the biscuit as cured.

My invention as heretofore stated embodies a method of pneumatically forming hollow rubber articles which have the seams of certain portions thereof lying in different planes. I have illustrated my invention in the formation of a toy animal wherein the legs on one side have the seams thereof at one side of the general plane of the body seam, while the legs on the other side have their seams on the other side of such plane. The various steps in the manufacture of this toy article comprises the pneumatic formation of a biscuit in a peculiar forming mold, then the transferring of the biscuit to a suitably shaped vulcanizing mold against the wall of which the biscuit is forced by internal pressure. The step of forming the biscuit will now be described.

In Fig. 1, I have illustrated four mold blocks 10, each having a general cavity 11, these blocks being mounted side by side in a suitable holder or basket 20. This basket is shown as a casting having a rectangular recess in which the blocks are mounted, the blocks being held in the basket by screws 21 passing through the bottom of the basket. The basket has the face of the recess bottom planed off as shown at 22 and surrounded by a depression or groove 23. The blocks 10 are formed with suitable grooves across their bases, as indicated at 13. Suitable vertical passageways 14 (Figs. 3 and 5) extend from the cavities 11 through the block to the grooves 13. There are a number of these passageways selected at various points of the cavity, as for example, one at each leg and one for the head of the animal and perhaps two for the body, though the number may be varied as found most convenient. These passageways are preferably made by drilling from the bottom of the block with one drill almost to the cavity and then with a smaller drill into the cavity as shown in Fig. 3.

It will be seen that the passageways and grooves provide a continuous conduit from the cavities 11 to the annular space 23 in the basket. A suitable passageway 25 communicates with the annular space and is threaded to receive an exhaust pipe. By this means, the various cavities may be exhausted of air, so that a sheet of rubber laid over them is drawn down into the cavities.

It is desirable to pneumatically clamp the sheet over the various cavities before the rubber stock is seated therein, and during the time of such seating, and the subsequent joining operation, and I effect this by making an annular groove 26 about the face of the composite mold communicating by passages 27 with the suction groove 23. It is convenient to machine the groove 26 partly in the edge wall of the basket and partly in the upper edge of the blocks. It is convenient also to drill the openings 27 half in the basket and half in the blocks. This is the construction shown in Figs. 1, 2, and 3. The co-operating mold members (designated 12 in Figs. 6 and 11) are suitably mounted. The result is a simple and effective pneumatic mold for the simultaneous manufacture of a plurality of biscuits.

Each mold cavity 11 is surrounded by raised cutting edge 15 with a beveled or rounded face. The combined cavity for the body of the article is preferably divided equally by the plane of separation of the molds, but in the cavities for the leg portions diverge from such plane. The cutting edge 15 shown in Figs. 1, 6 and 7, in plan, but the peculiar deflection thereof is most apparent in Figs. 10, 11 and 15, and will now be fully described with particular reference to the latter figures.

The cavities shown in Figs. 10 and 11 are designed for the formation of a biscuit which when vulcanized produces a toy horse. The cavity accordingly has, beside the main body portion, four leg extensions designated respectively 16, 17, 18 and 19. Now, in one of the mold members, as shown in Fig. 10, the extreme leg cavities 16 and 19 are located at elevations above the general plane of the body cavity, while the intermediate leg cavities 17 and 18 are below that plane.

Tracing the course of the cutting edge 15, that portion of the cutting edge which extends about the body of the animal from point $a$ to point $b$ (with perhaps the exception of the ear cavities) lies in a plane parallel with the face of the mold block. The cavities 16 and 19 are located on two plateaus above the plane of the body portion of the cutting edge 15, but substantially parallel with the plane: that is to say, the cutting edge extending from about the point $c$ around the leg to the point $d$, lies in a horizontal plane above the horizontal plane of the cutting edge from $a$ to $b$. The cutting edge inclines gradually down from $c$ to $a$. Now the intermediate leg cavities 17 and 18 lie in a depressed region, or, one might say, on the floor of a valley, with their cutting edge below the cutting edge about the body. Thus, the cutting edge from about the point $e$ to the point $f$ lies in a plane similar to cutting edge from the point $g$ to the point $h$, which is below that of the body portion of the cutting edge 15. From the point $d$ to the point $e$ the cutting edge descends rather abruptly, but always at an incline and never taking a vertical drop. From the point $f$, the cutting edge rises gradually and then descends to the point $g$. From the point $h$ the cutting edge rises rather steeply to about the point $i$ from which it passes while lying in the elevated plane to the point $j$, then from this point it descends to the point $b$.

The course of the cutting edge just described is for one of the forming mold members—whether the upper or lower member is immaterial. The cutting edge on the co-operating mold member shown in Fig. 11, is complementary to that described. There, the cavities 17ª and 18ª for the intermediate legs are located on a plateau while the extreme cavities 16ª and 19ª are located in a depressed region, and the cutting edge 15 on this mold block rises at $n$ from the leg cavity 19ª to the body cavity, corresponding to the angle at which it fell between the point $j$ and $b$ in the block 10. Similar complementary variations are found at $o$, $p$, $q$, and $r$.

By reason of the location of the leg cavities so that they are side by side, and the arrangement of the cutting edges to make a continuous course never passing behind itself or doubling too close to itself or changing too abruptly, I am able to seat the sheet rubber stock pneumatically in a warped condition over the combined cavities and in contact with the cutting edge throughout. Two sheets of stock are laid across the respective cavities and suction applied by the exhaust pipes 25, with the result that the sheet stock is held at the marginal groove 26 about the set of cavities and is drawn down smoothly and evenly into each portion of the cavity and held taut across the continuous cutting edge. Then when the two rubber-lined mold members are brought together, and such seated stock is joined between the beveled or rounded faces of the cutting edges to make a peripheral seam and at that time the stock is cut out from the two sheets, thus making a joined biscuit.

Before the junction, I may place in the lower rubber-lining cavities a small quantity of heat expanding substance, as for instance a mixture of sodium nitrite ammonium chloride and water. Now the formed biscuit is transferred to a vulcanizing mold and heated to cure the rubber wall and its seam as a unit, and the same heat changes the internal mixture to nitrogen under pressure, sodium chloride and water, whereby it is forced against the mold walls during curing, and thereafter remains permanently inflated. Any other desired means, however, may be employed for obtaining the internal pressure and the ultimate inflation.

The vulcanizing mold members 30 and 32 correspond approximately to the forming mold members, each having main cavity 31 and four leg cavities. The latter, in the mold block 30, are designated 36, 37, 38 and 39, and the corresponding cavities in the other mold block 32, are designated 36ª, etc. The various leg cavities are positioned similarly to those of the forming mold, that is to say, the cavities 36 and 39 are on a plateau, and the cavities 37 and 38 on the floor of a valley, in a block 30 of Fig. 12, while the cavities 36ª and 39ª are in a depressed region, and the cavities 37ª and 38ª are on a plateau in the block 32 of Fig. 13. While the vulcanizing mold cavities conform, in general, to those of the forming mold, they have various refinements to give the desired finished form to the article, as shown in Figs. 12 and 13.

An important difference between the forming mold and the curing mold is that the forming mold has the continuous raised cutting edge about the cavities, whereas, the curing mold has flat horizontal surfaces about the cavities. As shown, these surfaces are the general planes of the mold in Figs. 12 and 13, the flat plateau surfaces $t$ and $u$ and the flat depressed surface $v$ in Fig. 12, and the complementary depressed flat surfaces $w$ and $x$, and raised flat surface $y$, in Fig. 13.

The various flat surfaces of the two curing mold members 30 and 32 come tightly together when the molds are closed as shown in Fig. 17, thus confining the biscuit during vulcanization. The biscuit as made by the forming mold as indicated in Fig. 14 comprises a main body portion A and leg extensions B, C, D and E, all joined by a peripheral seam F which may take substantially the course indicated in Fig. 14. When such biscuit is transferred to the curing mold and cured, the originally formed seam is lost to view, but a slight fin may develop at the meeting face of the curing mold members, this fin being readily buffed off after the article is cured.

From the foregoing description, it will be seen that my invention is well adapted for the formation pneumatically from sheet stock of hollow rubber articles representing toy animals, wherein the planes passing through the leg portions are not the same as the planes passing through the seam of the body portion. It will further be seen that hollow rubber articles having these characteristics may thus be made with only forming and vulcanizing operations, that the cost is greatly reduced over the old dieing process, and the speed of production greatly increased.

I claim:

1. An apparatus for forming hollow articles of plastic material comprising a mold cavity embraced by a cutting edge having its cutting face diverted from a single plane, and a cooperating mold cavity embraced by a diverted cutting edge complementary to the first mentioned edge.

2. An apparatus for making hollow articles of plastic material comprising means for pneumatically seating two sheets of stock in two cooperating cavities, each surrounded by a raised cutting edge which in certain regions is diverted up or down from a single plane, the diversion in the two mold members being substantially equal in degree and opposite in direction and always less than 90°; bringing the lined cavities together to join the stock by a surrounding seam.

3. An apparatus for forming hollow articles of plastic material comprising means for seating by suction a sheet of stock in a mold cavity which terminates in a continuous cutting edge having its face lying at various elevations, means for seating in similar manner another sheet of stock in a cooperating mold cavity which terminates in a continuous cutting edge lying at various elevations which are complementary to the first mentioned planes, whereby when the two lined cavities are brought together, the two sheets are joined and the surplus stock cut off.

4. An apparatus for making hollow rubber articles having legs comprising means for pneumatically seating two sheets of rubber stock in two cavitary mold members, the cavities in the two members having the body portions thereof sunk from substantially a horizontal plane while the leg portions are sunk from various planes complementary in the two mold members, each mold member having a leg cavity above the horizontal plane and a leg cavity below such plane and the combined cavity of each member being surrounded by a continuous raised cutting edge the top of which is deflected from a single plane, whereby when such rubber lined mold members are brought together a seam is formed and the surplus stock is cut off, and means for thereafter vulcanizing the biscuit thus formed.

5. An apparatus for making hollow rubber articles comprising means for seating a sheet of stock in a multiple part cavity having different parts at different elevations and the complete cavity embraced by a cutting edge having its face lying in various planes, connected by ramps, means for seating another sheet of stock in a cooperating mold cavity which terminates in an embracing cutting edge complementary to the first mentioned, the two rubber lined cavities being adapted to be brought together to join the two sheets and cut off the surplus stock about the biscuit thus formed, and means for thereafter curing the biscuit.

6. An apparatus for making hollow articles of plastic material comprising means for seating by suction two sheets of stock in two cooperating cavities, each cavity having one portion at a different elevation from another portion, the elevations being relatively complementary in the two cavities, and each cavity being surrounded by a raised cutting edge which in certain regions is deflected from a horizontal plane, the deflection in the two mold members being substantially equal in degree and opposite in direction, the two lined cavities being adapted to be brought together to join the stock by a surrounding seam.

7. An apparatus for forming hollow articles of plastic material comprising means for pneumatically seating a sheet of stock in a mold cavity which terminates in an embracing cutting edge which lies in various planes and passes from one plane to another by a ramp, said edge always having a horizontal component and never passing behind itself, means for pneumatically seating another sheet of stock in a cooperating mold cavity which terminates in an embracing cutting edge complementary to the first mentioned cutting edge, the two lined cavities being adapted to be brought together to join the two sheets and cut off the surplus stock.

8. An apparatus for making hollow rubber articles having legs comprising means for pneumatically seating two sheets of rubber stock in two cavitary mold members, the cavities in the two members having similar body portions sunk from substantially a horizontal plane and having a leg cavity above the horizontal plane and a leg cavity below such plane, the combined cavity of each member being surrounded by a continuous raised cutting edge, which passes from one elevation to another by ramps, bringing the two rubber-lined mold members together to form a seam and cut off the surplus stock and means for thereafter vulcanizing the biscuit thus formed.

9. The mold for forming hollow articles of plastic material comprising two members each having a cavity which terminates in a continuous raised cutting edge lying at various elevations connected by ramps, the cutting edge on one mold member being complementary to the other, and passageways leading from the cavities, whereby the air may be exhausted therefrom.

10. A mold for making hollow articles of plastic material comprising a block having therein a cavity with parts of its rim at different elevations, a warped raised cutting edge embracing the cavity and a vent leading from the cavity.

11. A mold for making hollow articles comprising a basket having a supporting floor with a groove about it, a series of mold blocks in the basket resting on said floor, each block having a groove in its bottom adapted to be in communication with this groove in the basket, and an eduction passageway communicating with the latter groove.

12. A mold for making hollow articles comprising a basket having a supporting floor surrounded by walls, a groove at the junction of the floor and wall, and a series of mold blocks side by side in the basket and positioned by the walls thereof, each block having a cavity in its upper face, a groove in its lower face, and a passageway from the last mentioned groove to the cavity, said last mentioned groove being in communication with the first mentioned groove.

13. A mold for making hollow articles comprising a casting having a rectangular recess therein, a series of rectangular mold blocks side by side in said recess, resting on the floor thereof, a groove in said floor beneath the mold blocks, a passageway leading from said groove, a groove in the base of each mold block, a cavity in the face of each mold block, and a passageway in each mold block from the face cavity to the base groove thereof, said base grooves of the blocks being adapted to communicate with the floor groove of the basket.

14. The method of making articles of plastic material, comprising seating a sheet of stock with that region which is to form the junction with other stock distorted from a single plane, seating another sheet with its junction portion complementarily distorted, joining the two sheets at such distorted regions and simultaneously cutting through the sheets just outside of the junction.

15. The method of making articles of plastic material, comprising pneumatically seating a sheet of stock in such manner that a circuitous portion is distorted from a single plane, pneumatically seating another sheet with a corresponding circuitous portion complementarily distorted from a single plane, and bringing such two seated sheets together to join them at the distorted regions and at the same time cutting through them just outside of the junction.

16. The method of making hollow rubber articles comprising seating a sheet of stock by suction in a cavity the edge of which is distorted from a single plane in the region which is to form the junction, seating another sheet by suction with its junction portion complementarily distorted, thereafter joining the two sheets and at the same time cutting through them just outside the junction, then removing the joined article from its cavities and thereafter vulcanizing it in cavities having an undulating meeting surface.

In testimony whereof, I hereunto affix my signature.

JAMES SCHAEFER.